United States Patent [19]

Villain

[11] Patent Number: 5,496,980
[45] Date of Patent: Mar. 5, 1996

[54] SWITCH KNOB ADAPTED TO BE FIXED AND SEALED TO A SUPPORT

[75] Inventor: Jean-Christophe Villain, Paris, France

[73] Assignee: Alcatel Mobile Communication, Paris, France

[21] Appl. No.: 360,952

[22] Filed: Dec. 21, 1994

[30] Foreign Application Priority Data

Dec. 29, 1993 [FR] France .................... 93 15810

[51] Int. Cl.$^6$ .................................................. H01H 9/02
[52] U.S. Cl. .................... 200/296; 200/295; 200/301; 200/302.1; 248/56
[58] Field of Search .................... 200/296, 295, 200/294, 301, 302.1, 564, 565, 566, 567, 568, 569, 570, 571, 572; 248/56, 27.1, 27.3, 316.2

[56] References Cited

U.S. PATENT DOCUMENTS 5,146,056  9/1992  Kuczynski ................ 200/296
5,343,006  8/1994  Moffett ..................... 200/296
5,401,925  3/1995  Sambar ..................... 200/296

Primary Examiner—Henry J. Recla
Assistant Examiner—David J. Walczak
Attorney, Agent, or Firm—Sughrue, Mion, Zinn, Macpeak & Seas

[57] ABSTRACT

A switch knob has a mobile first part adapted to switch from one connection to another by rotation and a second part fixed to a support of the device on which the knob is mounted by an assembly device and a clamping device. The assembly device comprises two prism-shape members linked by a ring in two parts each including a hinge and is disposed between the second part and the support in a housing of the support provided for this purpose. The top of the prism-shape members faces towards the interior of the housing and their bases outside the housing so that clamping of the clamping device, by applying a force to the bases of the prism-shape members, moves the members towards each other and locks the second part to the support. Movement of the prism-shape members towards each other is facilitated by the hinges of the ring.

5 Claims, 1 Drawing Sheet

SWITCH KNOB ADAPTED TO BE FIXED AND SEALED TO A SUPPORT

BACKGROUND OF THE INVENTION

1. Field of the Invention

The present invention concerns switch knobs for electronic devices and in particular a switch knob of the type having a mobile part adapted to switch from one contact to another on rotation and a second part fixed to a support of the device on which the switch knob is mounted by assembly means and clamping means.

2. Description of the Prior Art

Switch knobs are usually fixed to the support of the device by means of a location whose shape mates with the periphery of the fixed part of the switch knob. Unfortunately, even the slightest play during assembly and the play created between the fixed part of the knob and its housing following repeated manipulation of the switch knob lead to an angular offset of the mobile part relative to its reference position which can lead to erroneous reading of indications associated with the switch knob.

This kind of problem has been solved in the prior art by fixing the switch knob to the printed circuit or by mounting the knob on a jig which positions it during clamping. Unfortunately, this type of mounting does not provide the seal required if the electronic device on which the knob is mounted is to be used out of doors, as in the case of a mobile telephone, for example.

Consequently, an object of the invention is to provide a switch knob which is fixed to its support in a sealed manner and which prevents even minimal play leading to erroneous reading of knob indications.

SUMMARY OF THE INVENTION

The invention consists in a switch knob having a mobile first part adapted to switch from one contact to another by rotation and a second part fixed to a support of the device on which said knob is mounted by assembly means and clamping means, wherein said assembly means comprises two prism-shape members linked by a two ring parts each including a hinge, said assembly means being disposed between said second part and said support in a housing of said support with the top of said prism-shape members facing towards the interior of said housing and their bases outside said housing so that clamping of said clamping means, by applying a force to said bases of said prism-shape members, moves said members towards each other and locks said second part to said support, said movement towards each other being facilitated by said hinges of said ring part.

The objects and features of the invention will be better understood from a reading of the following description given with reference to the drawing.

DETAILED DESCRIPTION OF THE PREFERRED EMBODIMENT

Figure 1:
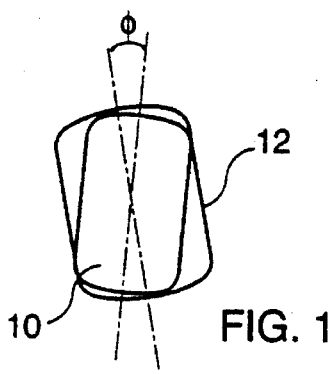
FIG. 1 is a diagram showing the angular offset resulting from play between the switch knob and its support in the prior art.
Figure 2:
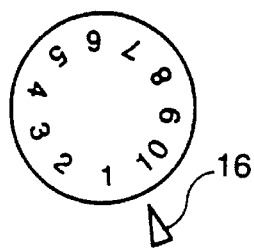
FIG. 2 shows the error in reading indications caused by the switch knob from FIG. 1.

Referring to FIG. 1, a switch knob is usually mounted by inserting the fixed part 10 of the knob into a housing 12 of the support having the same shape as the fixed part. Unfortunately, as the knob is operated play is created between the fixed part 10 and its housing 12 leading to an angular offset Φ between the axes of the knob and the housing. This angular offset is added to the rotation angle through which the mobile part of the switch knob turns each time that the knob is operated. As a consequence of this, the pointer 16 is offset relative to the values indicated by the knob, as shown in FIG. 2, where it is not clear whether the value indicated by the pointer is 1 or 10.

Figure 3:
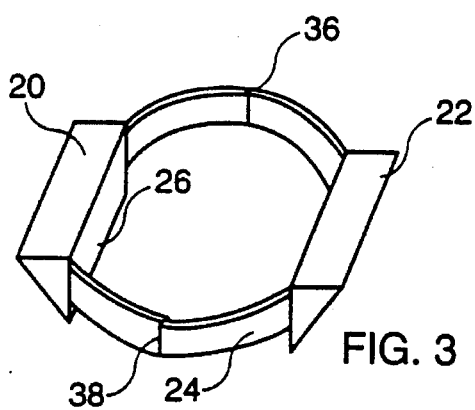
FIG. 3 is a perspective view of the switch knob assembly means of the present invention.
Figure 4:
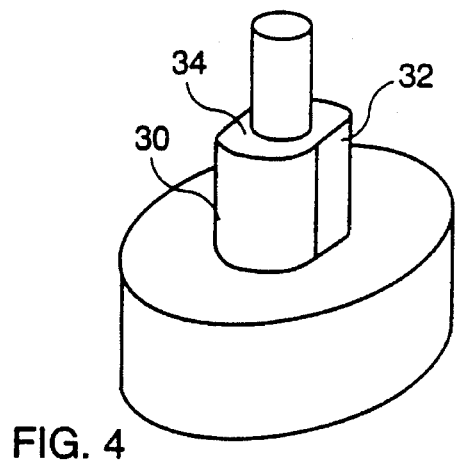
FIG. 4 is a diagrammatic perspective view of the switch knob using the FIG. 3 assembly means.
Figure 5:
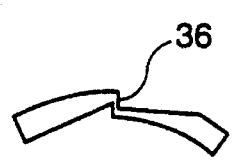
FIG. 5 shows the ring of the assembly means from FIG. 3 in section at the location of the hinge.
Figure 6:
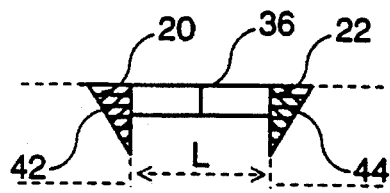
FIG. 6 is a view in section of the assembly means from FIG. 3 placed in the support on which the switch knob is mounted.

To overcome this drawback and to provide a seal as required for devices such as mobile telephones, the means of assembling the knob to its support are formed as shown in FIG. 3 and comprise two prism-shape members linked by a ring 24 created by two ring parts. The inside faces of the prisms (e.g. the face 26 of the prism 20) are parallel and are adapted to locate against opposite sides of the fixed part 30 of the switch knob (shown diagrammatically in FIG. 4) against the flats 32 and 34 on the fixed part 30. The ring 24 linking the two prisms 20 and 22 includes two hinges 36 and 38, the exact shape of which is shown in FIG. 5. Because of these two hinges the two prisms can lock the knob effectively and provide a good seal. Referring to FIG. 6, the assembly means comprising two prisms 20 and 22 and the ring 24 are placed in a housing in the support 40 whose inside shape is the same as the outside shape of the assembly means. Accordingly, the support includes two inclined planes 42 and 44 on which the respective prisms 20 and 22 locate. Pressure applied to the top of the prisms 20 and 22 pushes them down and this causes them to exert an increasing pressure on the two flats 32 and 34 of the fixed part of the switch knob. As the two prisms move down in this way, the distance L between them decreases, as does the diameter of the ring 24. The reduction in the diameter of the ring is made possible by the hinges 36 and 38.

Note that the hinges represent a substantial reduction in the thickness of the ring so that the ring deforms easily at the location of the hinge.

Figure 7:
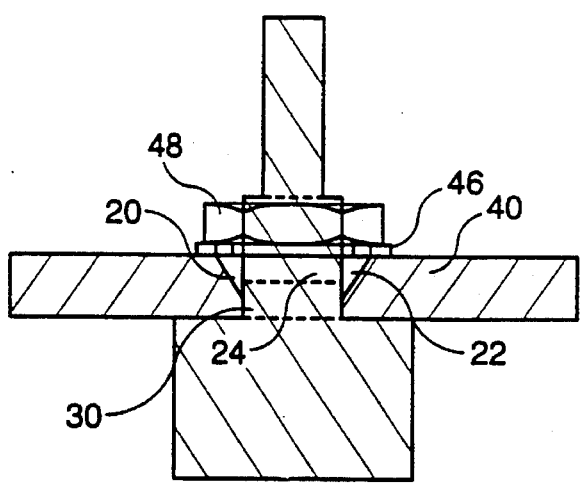
FIG. 7 is a sectional view of the switch knob fixed to its support by the assembly means from FIG. 3 and after clamping, in this instance by a nut.

FIG. 7 is a diagrammatic representation of the switch knob installed on the support 40. The fixed part 30 is fixed and sealed to the support 40 by the two prisms 20 and 22 linked by the ring 24. The whole is fixed by a washer 46 and a nut 48. As the nut 48 is tightened the washer 46 applies a force to the top of the prisms 20 and 22 which pushes them down and applies increasing pressure to the flats on the fixed part 30, the reduction in diameter of the ring 24 being accommodated by the hinges, as previously explained.

Because the prisms 20 and 22 apply a high pressure to the fixed part 30 and vice versa, they must be made from a plastics material adapted to deform only slightly under high pressure. The prisms are preferably made from polypropylene. Likewise the ring and its hinges.

There is claimed:

1. Switch knob having a mobile first part adapted to switch from one contact to another by rotation and a second part adapted to be fixed to a support of the device on which said knob is mounted by assembly means and clamping means, wherein said assembly means comprises two opposed prism-shape members linked by two ring parts each including a hinge, said assembly means being disposed between said second part and said support in a housing of said support with a top of said prism-shape members facing towards an interior of said housing and bases thereof outside said housing so that clamping of said clamping means, by applying a force to said bases of said prism-shape members, moves said members towards each other and locks said second part to said support, and wherein said movement towards each other is facilitated by said hinges of said two ring parts.

2. Switch knob according to claim 1 wherein said hinges of said ring parts are formed by a change of shape and a reduction in the thickness of said ring parts.

3. Switch knob according to claim 1 wherein said prism-shape members are of plastics material.

4. Switch knob according to claim 3 wherein said prism-shape members are of polypropylene.

5. Switch knob according to claim 1 adapted to be applied to a mobile telephone.

* * * * *